(12) United States Patent
Laycock et al.

(10) Patent No.: US 11,362,733 B2
(45) Date of Patent: Jun. 14, 2022

(54) OPTICAL SENSING AND COMMUNICATIONS SYSTEM

(71) Applicant: BAE SYSTEMS plc, London (GB)

(72) Inventors: Leslie Charles Laycock, Chelmsford (GB); Michael Stewart Griffith, Chelmsford (GB)

(73) Assignee: BAE SYSTEMS plc, London (GB)

( * ) Notice: Subject to any disclaimer, the term of this patent is extended or adjusted under 35 U.S.C. 154(b) by 608 days.

(21) Appl. No.: 15/999,355

(22) PCT Filed: Feb. 14, 2017

(86) PCT No.: PCT/GB2017/050383
§ 371 (c)(1),
(2) Date: Aug. 17, 2018

(87) PCT Pub. No.: WO2017/141020
PCT Pub. Date: Aug. 24, 2017

(65) Prior Publication Data
US 2019/0081702 A1 Mar. 14, 2019

(30) Foreign Application Priority Data

Feb. 19, 2016 (GB) .................................. 1603087
Sep. 29, 2016 (EP) .................................. 16191288

(51) Int. Cl.
*H04B 10/11* (2013.01)
*H04B 10/079* (2013.01)

(52) U.S. Cl.
CPC ....... *H04B 10/07955* (2013.01); *H04B 10/11* (2013.01)

(58) Field of Classification Search
CPC .......................... H04B 10/07955; H04B 10/11
(Continued)

(56) References Cited

U.S. PATENT DOCUMENTS 5,808,760 A * 9/1998 Gfeller ............... H04B 10/1143
398/119
5,822,099 A * 10/1998 Takamatsu ......... H04B 10/1121
398/162
(Continued)

FOREIGN PATENT DOCUMENTS

EP 0822394 A2 2/1998
WO 94/17430 8/1994
WO 2017/141020 A1 8/2017

OTHER PUBLICATIONS

International Preliminary Report on Patentability received for Patent Application No. PCT/GB2017/050383, dated Aug. 30, 2018. 6 pages.
(Continued)

*Primary Examiner* — Dibson J Sanchez
(74) *Attorney, Agent, or Firm* — Finch & Maloney PLLC

(57) ABSTRACT

An optical system (100) comprising: a transmitter module (102) configured to transmit a sequence of optical pulses (300), each optical pulse in the sequence (300) having a different magnitude to each other optical pulse in the sequence (300); a receiver module (104) comprising one or more optical signal detectors, the receiver module (104) configured to receive the sequence of optical pulses (300) transmitted by the transmitter module (102); and one or more processors (110) configured to process the sequence of optical pulses received by the receiver module (104) to select an optical pulse from the received sequence of optical pulses (400) based on one or more predetermined criteria. The one or more predetermined criteria include a criterion that the selected optical pulse does not saturate the one or more optical signal detectors.

20 Claims, 4 Drawing Sheets

(58) Field of Classification Search
USPC .................................. 398/118–131, 182–201
See application file for complete search history.

(56) References Cited

U.S. PATENT DOCUMENTS

| | | | | |
|---|---|---|---|---|
| 5,917,636 | A * | 6/1999 | Wake | H04B 10/25752 398/182 |
| 6,366,375 | B1 * | 4/2002 | Sakai | H04B 10/032 398/43 |
| 7,113,708 | B1 * | 9/2006 | Creaney | H04B 10/07955 398/140 |
| 8,934,778 | B2 * | 1/2015 | Futami | H04B 10/0775 398/135 |
| 9,083,456 | B2 * | 7/2015 | Fox | H04B 10/85 |
| 9,306,665 | B1 | 4/2016 | Amir | |
| 9,413,465 | B2 * | 8/2016 | Tanaka | H04J 14/0282 |
| 2003/0076569 | A1 * | 4/2003 | Stevens | H04B 10/504 398/192 |
| 2006/0018661 | A1 * | 1/2006 | Green | H04B 10/1127 398/128 |
| 2006/0062099 | A1 * | 3/2006 | Yazaki | H04B 10/1143 369/44.11 |
| 2007/0003280 | A1 * | 1/2007 | Sada | H04B 10/66 398/27 |
| 2007/0189768 | A1 * | 8/2007 | Yang | H04B 10/40 398/38 |
| 2008/0166135 | A1 * | 7/2008 | Ann | H04B 10/1143 398/197 |
| 2009/0162053 | A1 * | 6/2009 | Ikeda | H04B 10/27 398/25 |
| 2010/0142972 | A1 * | 6/2010 | Chou | H04B 10/07955 398/158 |
| 2011/0076024 | A1 * | 3/2011 | Damink | H04B 10/116 398/130 |
| 2011/0240865 | A1 * | 10/2011 | Frach | G01T 1/2018 250/362 |
| 2012/0106978 | A1 * | 5/2012 | Jenson | H04B 10/1127 398/182 |
| 2012/0263460 | A1 * | 10/2012 | Movassaghi | H04B 10/40 398/38 |
| 2015/0171963 | A1 * | 6/2015 | Bhoja | H04B 10/2575 398/115 |
| 2016/0099773 | A1 | 4/2016 | Raj | |
| 2016/0231547 | A1 * | 8/2016 | Kubo | G02B 21/008 |
| 2016/0327639 | A1 * | 11/2016 | Albert | F16P 3/144 |

OTHER PUBLICATIONS

International Search Report and Written Opinion received for Patent Application No. PCT/GB2017/050383, dated May 4, 2017. 11 pages.
GB Intellectual Property Office Search Report under Section 17(5) received for GB Patent Application No. 1603087.6 dated Jul. 21, 2016. 3 pages.
Extended European Search Report received for EP Application No. 16191288.6 dated Mar. 22, 2017. 8 pages.

* cited by examiner

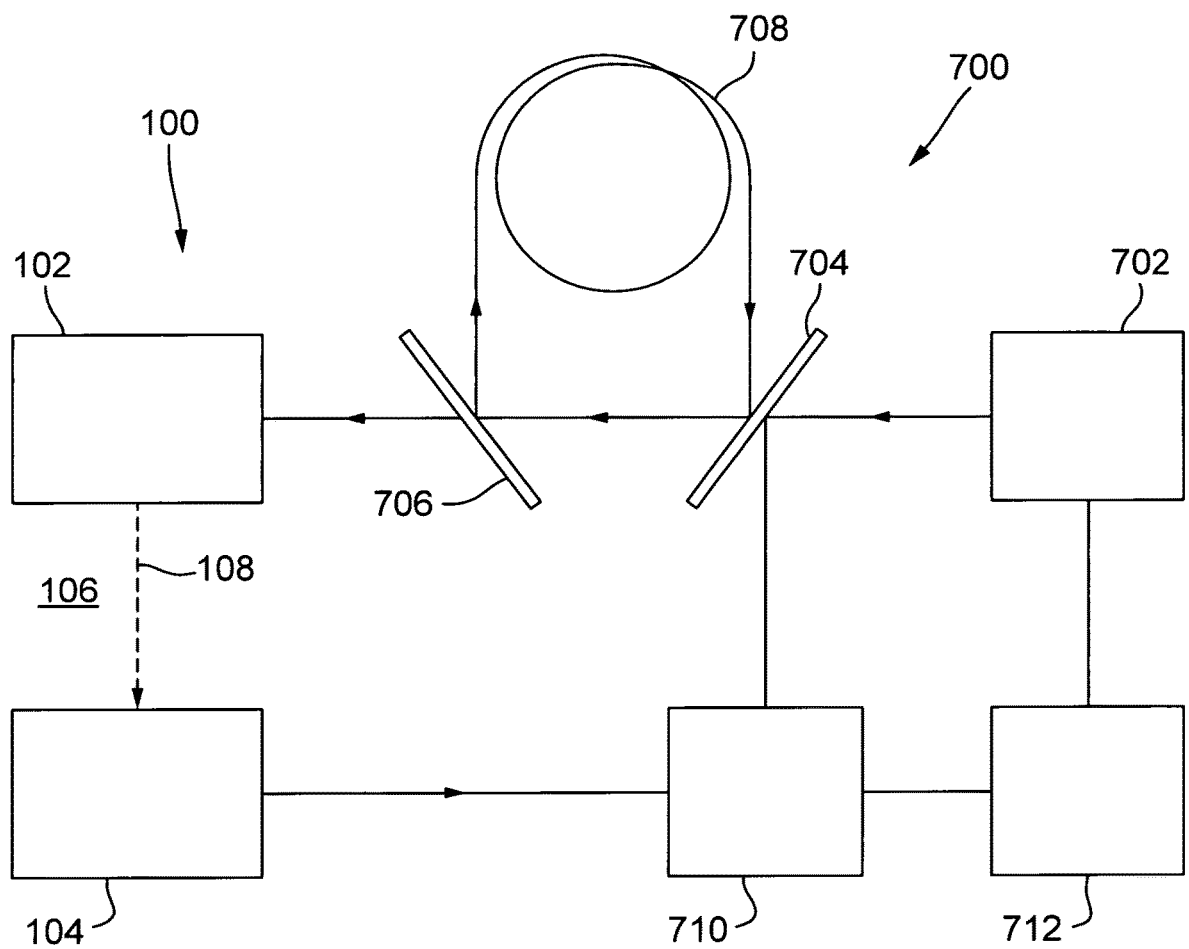

OPTICAL SENSING AND COMMUNICATIONS SYSTEM

FIELD OF THE INVENTION

The present invention relates to optical sensing and/or optical communications systems.

BACKGROUND

Typically, Silicon Photomultiplier (SiPM) detectors comprise a dense array of small, electrically and optically isolated photon detectors (which are often called "microcells"). Each microcell detects photons substantially identically and independently with a discrete recovery time. The recovery time varies with the array size and microcell size, but is typically approximately 35 ns to 100 ns.

Output signals of multiple microcells in the array may be combined to form a quasi-analogue SiPM detector output signal.

Typically, the greater the number of microcells in the array, the larger the dynamic range of the SiPM detector is.

Typically, an SiPM detector will start to saturate when the number of incident photons multiplied by the photon detection efficiency equals at least the number of microcells in the array.

SUMMARY OF THE INVENTION

SiPM detectors tend to be highly sensitive, having relatively large responsivities (~$10^6$ NW). Also, SiPM detectors tend to saturate more quickly than other optical detectors. The present inventors have realised that, where a SiPM detector is being used in sensor system and/or as a data detector in an optical communications system (for example, where a linear response is preferred), this relatively early onset of saturation may be undesirable.

The present inventors have realised that a sequence of pulses having varying (e.g. decreasing) magnitude (i.e. intensity) may be used to account for the early onset of saturation of SiPM detectors. For example, the present inventors have realised that, in a sensor system, a sequence of pulses having decreasing magnitude may enable the system to choose which pulse to take the measurement from. Also, the present inventors have realised that, in an optical communications system, a sequence of pulses having decreasing magnitude may be used to determine how much transmit energy to use in communications between a transmitter and a receiver.

In a first aspect the present invention provides an optical system comprising: a transmitter module configured to transmit a sequence of optical pulses, each optical pulse in the sequence having a different magnitude to each other optical pulse in the sequence; a receiver module configured to receive the sequence of optical pulses transmitted by the transmitter module; and one or more processors configured to process the sequence of optical pulses received by the receiver module to select, from the received sequence of optical pulses, an optical pulse based on one or more predetermined criteria. The one or more predetermined criteria may include a criterion that the pulse does not saturate an optical signal detector of the receiver module.

The receiver module may comprise a Silicon Photomultiplier detector for detecting the sequence of optical pulses transmitted by the transmitter module.

The one or more processors may be configured to select, from the received sequence of optical pulses, from the pulses having magnitudes within the linear range of the receiver, a pulse having the largest magnitude. The one or more processors may be configured to select, from the received sequence of optical pulses, a pulse having an optimum magnitude for a predetermined application. The one or more processors may be configured to select, from the received sequence of optical pulses, a largest magnitude optical pulse that does not saturate an optical signal detector of the receiver module.

The one or more predetermined criteria may include a criterion that the selected pulse is the first pulse in the sequence that does not saturate an optical signal detector of the receiver module.

The sequence of optical pulses may be a sequence of optical pulses having decreasing or increasing magnitudes. For example, the sequence of optical pulses may have strictly decreasing, or strictly increasing, magnitudes.

The one or more processors may be further configured to determine data from the selected optical pulse, the data specifying a material property of one or more entities with which the selected optical pulse interacted between the transmitter module and the receiver module.

The optical system may further comprise means for transferring, from the one or more processors to the transmitter module, information specifying the selected optical pulse.

The transmitter module may be further configured to, responsive to the transmitter module receiving the information specifying the selected optical pulse, transmit a further optical signal to the receiver module, the further optical signal having a magnitude substantially equal to the pulse from the transmitted sequence that corresponds to the selected optical pulse. The receiver module may be arranged to receive the further optical signal. The one or more processors may be further configured to determine data from the further optical pulse received by the receiver module, the data specifying a material property of one or more entities with which the selected optical pulse interacted between the transmitter module and the receiver module.

The optical system may further comprise one or more objects disposed between the transmitter module and the receiver module. The one or more objects may be arranged to receive the sequence of optical pulses transmitted by the transmitter module, and reflect or scatter the received sequence of optical pulses to the receiver module. The one or more objects may include a retro-reflector.

The transmitter module may comprise one or more transmitter lasers configured to generate a sequence of optical pulses, and modulation means configured to modulate the optical pulses generated by the one or more transmitter lasers to provide that each optical pulse in the sequence has a different magnitude to each other pulse in the sequence. The modulation means may include modulation means for directly modulating an output from the one or more transmitter lasers. The modulation means may include an external modulator.

The optical system may further comprise: one or more lasers configured to generate an optical signal; a first beam splitter; a second beam splitter; and an optical delay line. The one or more lasers may be coupled to a first input of the first beam splitter such that the first beam splitter receives an optical signal from the one or more lasers. The first beam splitter may be configured to split an optical signal received at its first input between a first output of the first beam splitter and a second output of the first beam splitter. An input of the second beam splitter may be coupled to the first output of the first beam splitter. The second beam splitter may be configured to split an optical signal received at its input between a first output of the second beam splitter and a second output of the second beam splitter. The transmitter module may be coupled to the first output of the second beam splitter. An input of the optical delay line may be coupled to the second output of the second beam splitter. An output of the optical delay line may be coupled to a second input of the first beam splitter. The first beam splitter may be configured to split an optical signal received at its second input between the first output of the first beam splitter and the second output of the first beam splitter. A transmitivity of the first beam splitter may be substantially equal to a transmitivity of the second beam splitter. A reflectivity of the first beam splitter may be substantially equal to a reflectivity of the second beam splitter.

In a further aspect, the present invention provides a method for performance by an optical system. The method comprises: transmitting, by a transmitter module, a sequence of optical pulses, each optical pulse in the sequence having a different magnitude to each other optical pulse in the sequence; receiving, by a receiver module, the sequence of optical pulses transmitted by the transmitter module; and processing, by one or more processors, the sequence of optical pulses received by the receiver module to select an optical pulse from the received sequence of optical pulses based on one or more predetermined criteria. The one or more predetermined criteria may include a criterion that the pulse does not saturate an optical signal detector of the receiver module.

BRIEF DESCRIPTION OF THE DRAWINGS

FIG. 7 is a schematic illustration (not to scale) illustrating a recirculating fibre optic delay line system for generating the sequence of transmit optical pulses.

DETAILED DESCRIPTION

Figure 1:
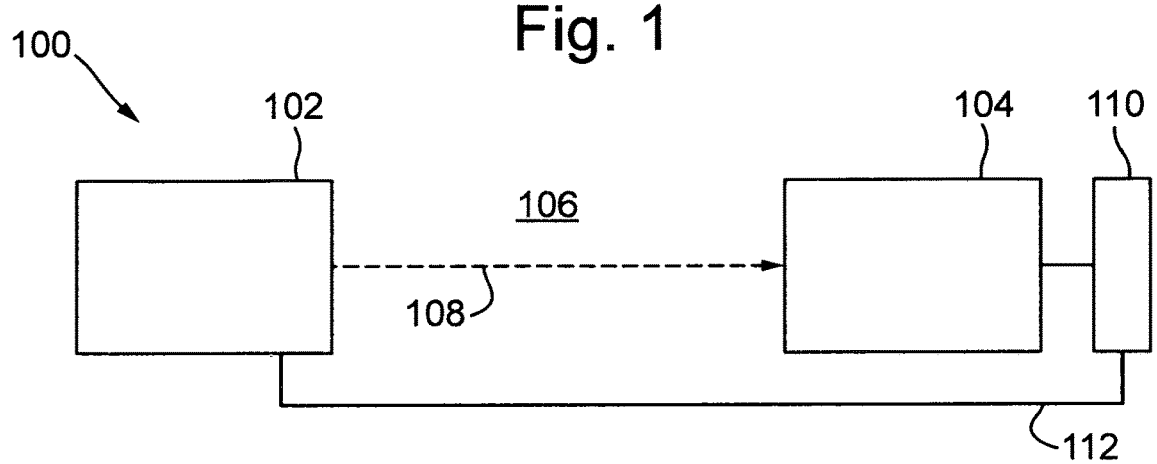
FIG. 1 is a schematic illustration (not to scale) of an embodiment of an optical sensing and communications system.

FIG. 1 is a schematic illustration (not to scale) of an embodiment of an optical sensing and communications system 100 comprising a transmitter 102 and a receiver 104 separated by a volume of optical medium 106, a processor 110 and a communications link 112.

The transmitter 102 is an optical transmitter configured to transmit an optical signal 108 through the optical medium 106 from the transmitter 102 to the receiver 104. The transmitter 102 and the receiver 104 may be for underwater applications.

In this embodiment, the receiver 104 comprises a Silicon Photomultiplier (SiPM) detector which may include a dense array of small, electrically and optically isolated photon detectors (microcells). The receiver 104 is an optical receiver 104 configured to detect the optical signal 108 transmitted by the transmitter 102. The receiver 104 is further configured to generate an output dependent upon the measured optical signal 108. The receiver 104 is coupled to the processor 110 such that the output of the receiver 104 may be sent from the receiver 104 to the processor 110.

The optical medium 106 may be any appropriate optical medium including, but not limited to, air or water (for example, seawater).

The optical signal 108 may be any appropriate optical signal, such as a laser beam. The attenuation of the optical signal 108 as it passes through the optical medium 106 between the transmitter 102 and the receiver 104 may vary, for example, over time and/or distance travelled through the optical medium 106 by the optical signal 108. For example, in some embodiments, the attenuation coefficient of the optical medium 106 is variable. The attenuation of the optical signal 108 may vary dependent upon changes of one or more parameters which may include, but are not limited to, a path length for the optical signal 108, turbulence within the optical medium 106, absorption of the optical signal 108 by the optical medium 106, and/or scatter of the optical signal 108 by the optical medium 106.

The processor 110 is configured to receive and process the output generated by the receiver 104. The processor 110 is further coupled to the transmitter 102 via the communications link 112 such that a signal may be sent from the processor 110 to the transmitter 102 via the communications link 112.

In this embodiment, the communications link 112 is an optical communications link. However, in other embodiments the communications link 112 is a link other than an optical communications link, for example, an electrical communications link. The communications link 112 may be a wired or wireless communications link.

Apparatus, including the processor 110, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 2 and described below may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

Figure 2:
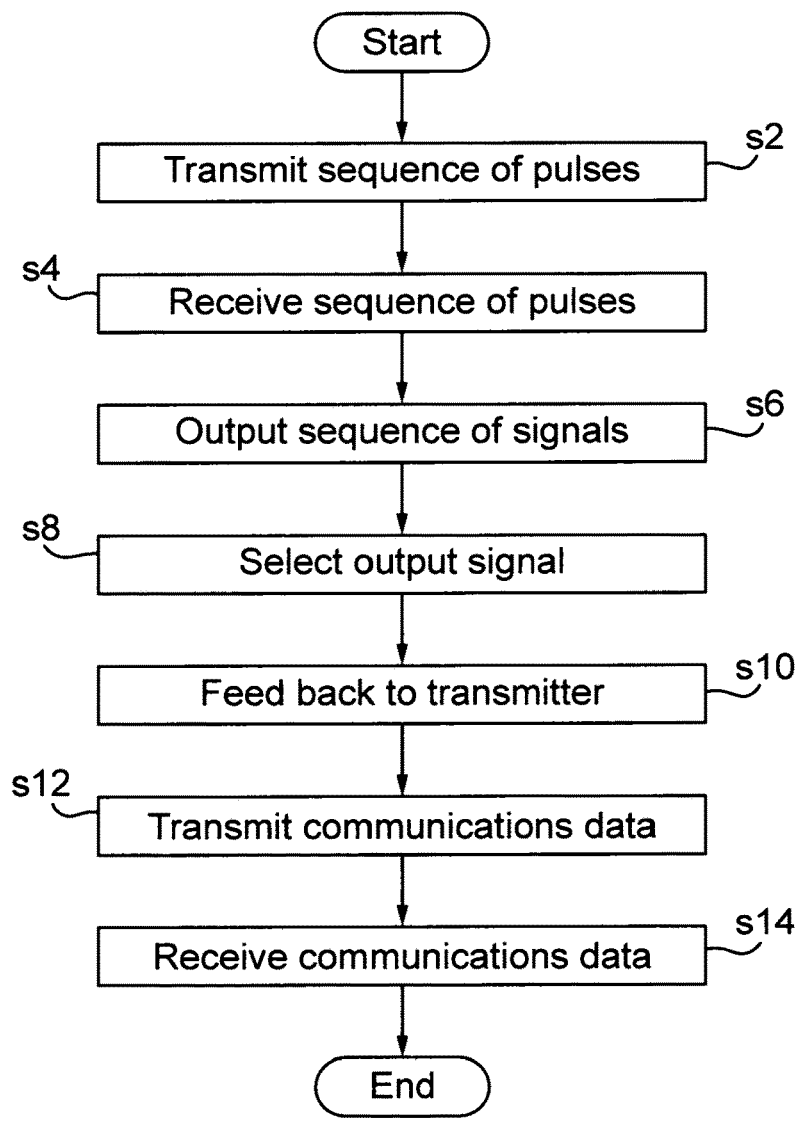
FIG. 2 is a process flow chart showing certain steps of a communications process performed by the optical sensing and communications system.

FIG. 2 is a process flow chart showing certain steps of a communications process performed by the optical sensing and communications system 100.

At step s2, the transmitter 102 generates a sequence of pulses and transmits the sequence of pulses through the optical medium 106 to the receiver 104.

Figure 3:
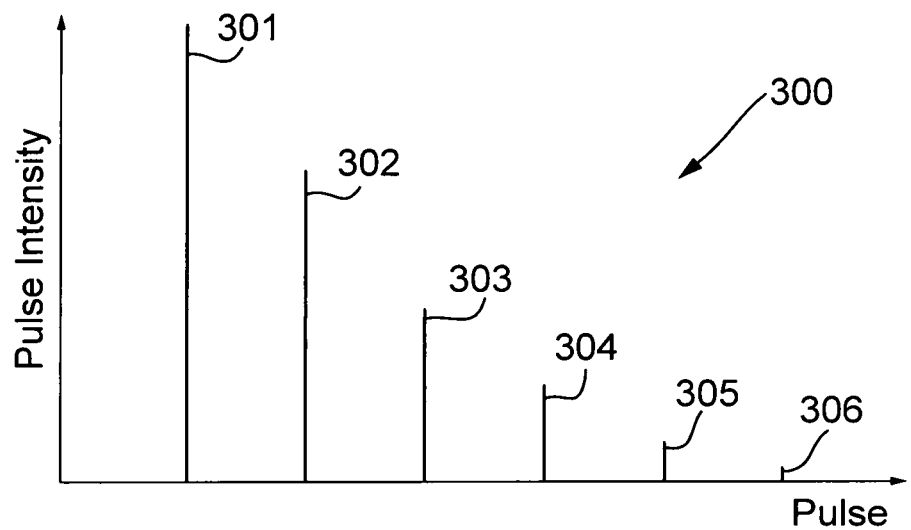
FIG. 3 is a schematic illustration (not to scale) showing a sequence of transmit optical pulses.

FIG. 3 is a schematic illustration (not to scale) illustrating the sequence of transmit pulses 300 transmitted by the transmitter to the receiver 104.

In this embodiment, the sequence of transmit pulses 300 comprises six pulses, namely a first transmit pulse 301, a second transmit pulse 302, a third transmit pulse 303, a fourth transmit pulse 304, a fifth transmit pulse 305, and a sixth transmit pulse 306.

The transmit pulses 301-306 in the sequence of transmit pulses 300 have decreasing magnitude. In this embodiment, the first transmit pulse 301 has the largest magnitude of the transmit pulses 301-306. The magnitude of the second transmit pulse 302 is less than that of the first transmit pulse 301 and greater than that of the third transmit pulse 303. The magnitude of the third transmit pulse 303 is less than that of the second transmit pulse 302 and greater than that of the fourth transmit pulse 304. The magnitude of the fourth transmit pulse 304 is less than that of the third transmit pulse 303 and greater than that of the fifth transmit pulse 305. The magnitude of the fifth transmit pulse 305 is less than that of the fourth transmit pulse 304 and greater than that of the sixth transmit pulse 306. The magnitude of the sixth transmit pulse 306 is less than that of the fifth transmit pulse 305.

The intensities of the transmit pulses 301-306 may decrease according to any appropriate function.

In this embodiment, each of the transmit pulses 301-306 is an optical signal. The transmit pulses 301-306 are transmitted through the optical medium 306.

In this embodiment, the transmitter 102 comprises one or more lasers for generating optical signals 108, e.g. for generating the sequence of transmit pulses 300. The sequence of transmit pulses 300 is generated by directly modulating the output from the transmitter lasers by controlling the drive current of the lasers. The bandwidth and the pulse repetition rate may depend on a diode and diode driver of the transmitter lasers.

Returning now to the description of FIG. 2, at step s4, the receiver 104 detects the sequence of pulses 300 transmitted by the transmitter 102. The receiver 104 detects and counts the transmit pulses 301-306.

Figure 4:
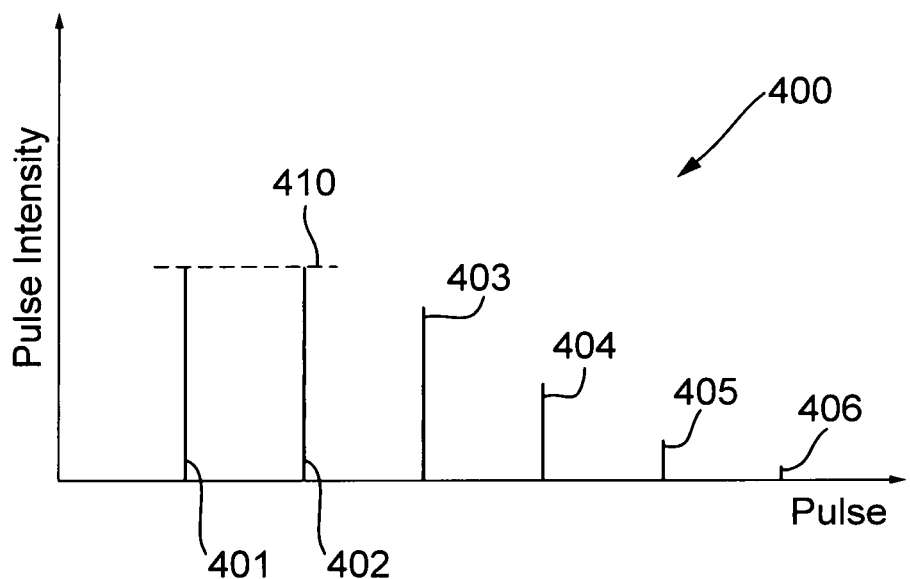
FIG. 4 is a schematic illustration (not to scale) illustrating a sequence of detected pulses.

FIG. 4 is a schematic illustration (not to scale) illustrating the sequence of detected pulses 400 as detected by the receiver 104.

In this embodiment, the sequence of detected pulses 400 comprises six pulses, namely a first detected pulse 401, a second detected pulse 402, a third detected pulse 403, a fourth detected pulse 404, a fifth detected pulse 405, and a sixth detected pulse 406.

In this embodiment, the receiver 104 has a saturation level 410. The saturation level 410 is, in effect, a limit to the optical signal magnitude that is detectable by the receiver 104.

In this embodiment, the first detected pulse 401 is the receiver's detection of the first transmit pulse 301. Similarly, the second detected pulse 402 is the receiver's detection of the second transmit pulse 302, and so on.

Each of the first and second transmit pulses 301, 302 as received by the receiver 104 saturate the receiver 104, i.e. the first and second transmit 301, 302 pulses each has an magnitude that is greater than or equal to the saturation level 410 of the receiver 104 even after attenuation of the signal by the optical medium 106. Thus, the intensities of the first and second detected pulses 401, 402 are limited to the saturation level 410.

The third through sixth transmit pulses 303-306 do not saturate the receiver 104, i.e. the third through sixth transmit pulses 303-306 each has an magnitude that is less than the saturation level 410 of the receiver 104. In this embodiment, the measured intensities of the third, fourth, fifth, and sixth detected pulses 404, 404, 405, 406 are less than or equal to (or some function of) the intensities of the third, fourth, fifth, and sixth transmit pulses 304, 304, 305, 306 respectively. The pulses travelling from the transmitter 012 to the receiver 104 may be attenuated at least to some extent.

In this embodiment, the third detected pulse 403 has the highest magnitude of all of the detected pulses 401-406 that do not saturate the receiver 104.

Returning now to the description of FIG. 2, at step s6, the receiver 104 generates and outputs a respective output signal for each of the detected pulses 401-406. Each output signal is indicative of the measured magnitude of a respective detected pulse 401-406. The receiver 104 sends the generated output signals to the processor 110.

At step s8, the processor 110 receives and processes the outputs signals generated by the receiver 104.

In this embodiment, the processor 110 processes the output signals to determine which of the transmit pulses 301-306 has the "best" (for example, an optimum) magnitude for communications between the transmitter 102 and the receiver 104.

In this embodiment, the processor 110 determines the transmit pulse 301-316 having the best magnitude for communications as follows. Firstly, using the signals output by the receiver 104, the processor 110 selects the detected pulse 401-406 having the highest magnitude value that does not saturate the receiver 104 and counts its position in the received sequence. Secondly, the processor determines that the transmit pulse 301-316 having the best magnitude for communications is the transmit pulse 301-316 having the same position in the transmit sequence 300 as the detected pulse having the highest magnitude value that does not saturate the receiver 104 has in the received sequence. Thus, in this embodiment, the processor 110 determines the transmit pulse 301-316 having the best magnitude for communications to be the third transmit pulse 303.

The transmit pulse 301-316 having the best or optimal magnitude for communications may be the signal having the largest magnitude that is within the receiver's linear range. Advantageously, this tends to provide improved signal to noise ratio. Furthermore, this tends to provide overhead for changes in magnitude resulting from variations in propagation losses.

The determined transmit pulse (e.g. pulse 303) may have a magnitude that is optimal with regard to its dynamic range for communications between the transmitter 102 and the receiver 104.

At step s10, the processor 110 identifies the determined transmit pulse to the transmitter 102.

This identification of the determined transmit pulse by the processor 110 to the transmitter 102 may be performed in any appropriate way. For example, the processor 110 may send a signal specifying the third transmit pulse 303 to the transmitter 102 via the communications link 112.

Thus, a communications protocol is established between the transmitter 102 and the receiver 104. The transmitter 102 and the receiver 104 in effect agree to communicate using optical signals having magnitudes equal to that of the determined transmit pulse (i.e. pulses 303 in this embodiment).

At step s12, the transmitter 102 sends one or more optical communications signals to the receiver 104. The communications signals specify communications data.

In this embodiment, the transmitter 102 operates such that the magnitude of each of the communications signals is equal to the magnitude of the determined transmit pulse identified to the transmitter 102 at step s10. Thus, in this embodiment, the magnitudes of the optical communications signals transmitted by the transmitter 102 are equal to the magnitude of the third transmit signal 303.

Advantageously, the communications signals tend to have magnitudes large enough to provide robustness to signal attenuation by the optical medium 106, while at the same time being not causing unwanted saturation of the receiver 102.

At step s14, the receiver 104 detects the optical communications signals transmitted by the transmitter 102. The receiver 104 and/or the processor 110 may determine the communications data from the received optical communications signals.

Thus, a communications process performed by the optical sensing and communications system 100 is provided.

SiPM detectors tend to be advantageously resistant to damage, for example compared to detectors such as photomultiplier tubes (PMTs).

SiPM detectors tend to have low operating voltages, and be compact, robust, and low cost.

The above described apparatus and method advantageously may be implemented to mitigate the effects of the relatively limited dynamic range of SiPM detectors.

Also, the above described apparatus and method advantageously may be implemented to mitigate the effects of the output of an SiPM detector becoming saturated at higher incident light levels. This tends to be particularly advantageous in applications that require an analogue response from the receiver.

Advantageously, the sequence of pulses having decreasing magnitude may be used to determine how much transmit energy to use for communications between the transmitter and the receiver before communication has begun. Advantageously, a transmission signal magnitude that is substantially optimal with regard to signal dynamic range for a given task, for example for a sensing task or a communications task, tends to be determined. Use of the sequence of pulses tends to identify a transmission signal magnitude that avoids, or at least reduces to some extent, the saturation of a receiving SiPM detector. Thus, transmit energy tends not to be wasted. Also, by avoiding the transmission of superfluous power, improved covertness tends to be provided.

In the above embodiments, the attenuation of an optical signal passing between the transmitter and the receiver may fluctuate. For example, the attenuation properties of the optical medium may vary. These fluctuations in path attenuation tend to generate corresponding variations in the signal level incident on the receiver. The above described system and method advantageously tends to provide for a linear response from the receiver under conditions of fluctuating path attenuation.

Also, the above described system and method tends to enable signal loss to be quantified. Thus, the system may determine that the received signal levels have become sub-optimal, for example, as a result of changing path attenuation. In some embodiments, the processor may determine signal loss using values of the magnitude of the first pulse from the transmitter (which may be the transmitter's maximum power), the pulse number of the optimum received pulse, and a pulse-to-pulse reduction factor.

Advantageously, if the received signal levels become sub-optimal, the transmitter can be requested to repeat the sequence of transmit pulses (or send a different sequence of pulses) in order to re-determine the optimum transmission power.

Also, the above described system and method tends to enable the path length between the transmitter and the receiver (and/or between the transmitter and a scattering surface or retro-reflector if present) to be determined. Such calculations may use a known value of the attenuation coefficient of the optical medium. Determination of path length tends to be particularly useful in applications in which relative movement of the transmitter and the receiver occurs, such as in docking procedures.

The above described system and method tends to enable a minimum transmit power that provides the optimum pulse magnitude at the receiver (i.e. the power of the pulse having the maximum magnitude within the linear range of the receiver) to be determined. This tends to be particularly useful for a digital communications system. Furthermore, this tends provide for increased communications security.

In the above embodiments, the optical sensing and communications system comprises a single transmitter and a single receiver. However, in other embodiments, the optical sensing and communications system comprises multiple transmitters and/or multiple receivers.

In the above embodiments, the transmitter only transmits signals, and the receiver only receives incident signals. However, in other embodiments, the transmitter is configured to receive optical (or other) signals, i.e. the transmitter may be a transceiver. In some embodiments, the receiver is configured to transmit optical (or other) signals, i.e. the receiver may be a transceiver. Thus, the optical sensing and communications system may include a two-way communications link.

In the above embodiments, the optical sensing and communications system comprises a non-optical communications link between the processor and the transmitter via which signal magnitude information may be sent from the processor to the transmitter. However, in other embodiments, this communications link is an optical link. For example, in an embodiment in which the transmitter and the receiver are both transceivers capable of both transmitting and receiving optical signals, the receiver may send the signal magnitude information determined by the processor to the transmitter as an optical signal through the optical medium.

In the above embodiments, the receiver comprises a SiPM detector which may include a dense array of small, electrically and optically isolated photon detectors. However, in other embodiments, the receiver is a different type of optical sensor, such as a SiPM detector having photon detectors in an arrangement other than a dense array. In some embodiments, the receiver comprises one or more different types of optical sensor other a SiPM detector instead of or in addition to the SiPM detector. For example, the receiver may comprise one or more photomultiplier tubes (PMTs).

In the above embodiments, the sequence of transmit pulses comprises six pulses having decreasing magnitude. The magnitude of the pulses may decrease monotonically, however preferably the magnitude of the pulses is strictly decreasing. However, in other embodiments, the sequence of transmit pulses comprises a different number of pulses, for example, more than six. Also, in some embodiments, the sequence of transmit pulses do not have decreasing magnitude. For example, in some embodiments, the pulses have increasing magnitude in the sequence, i.e. a subsequent pulse has a greater magnitude than a previous pulse. The magnitude of the pulses may increase monotonically, however preferably the magnitude of the pulses is strictly increasing. In some embodiments, the intensities of the pulses in the sequence are random or pseudorandom.

In the above embodiments, the "best" magnitude for communications between the transmitter and the receiver is determined to be the magnitude of the transmit pulse having the highest magnitude value that does not saturate the receiver. The magnitude of transmit communications signals is set to be equal to this so-called "best" magnitude. However, in other embodiments, the best, or optimum, magnitude for communications is determined using one or more different criteria. For example, the "best" magnitude for communications between the transmitter and the receiver may be determined to be the magnitude of the transmit pulse having the second highest magnitude value that does not saturate the receiver. Also for example, the "best" magnitude for communications between the transmitter and the receiver may be determined to be the magnitude of the transmit pulse having the lowest magnitude value that is detectable by the receiver.

Also, in some embodiments, the magnitude for communication signals may be determined in a different way. For example, the magnitude of transmit communications signals may be set to be some function of the "best" magnitude. For example, the magnitude of transmit communications signals may be set to be a value greater than the determined "best" magnitude to account for possible future increases in signal attenuation.

In the above embodiments, the transmitter sends optical signals directly to the receiver through the optical medium. Also, the optical sensing and communications system is implemented for a communications application in which communication data is sent from the transmitter to the receiver. However, in other embodiments, the transmitter does not send optical signals directly to the receiver. Also, in some embodiments, the optical sensing and communications system is implemented for a different application instead of or in addition to the communications application, for example a sensing application. For example, in some embodiments, the sequence of pulses is used to determine a transmission power for optical sensing signals. Sensing signals having the determined transmission power may then be sent from the transmitter to the receiver. The receiver and/or processor may then analyse received sensing signals to determine material properties of one or more entities with which the sensing signal interacted between the transmitter and receiver, for example the optical medium.

Figure 5:
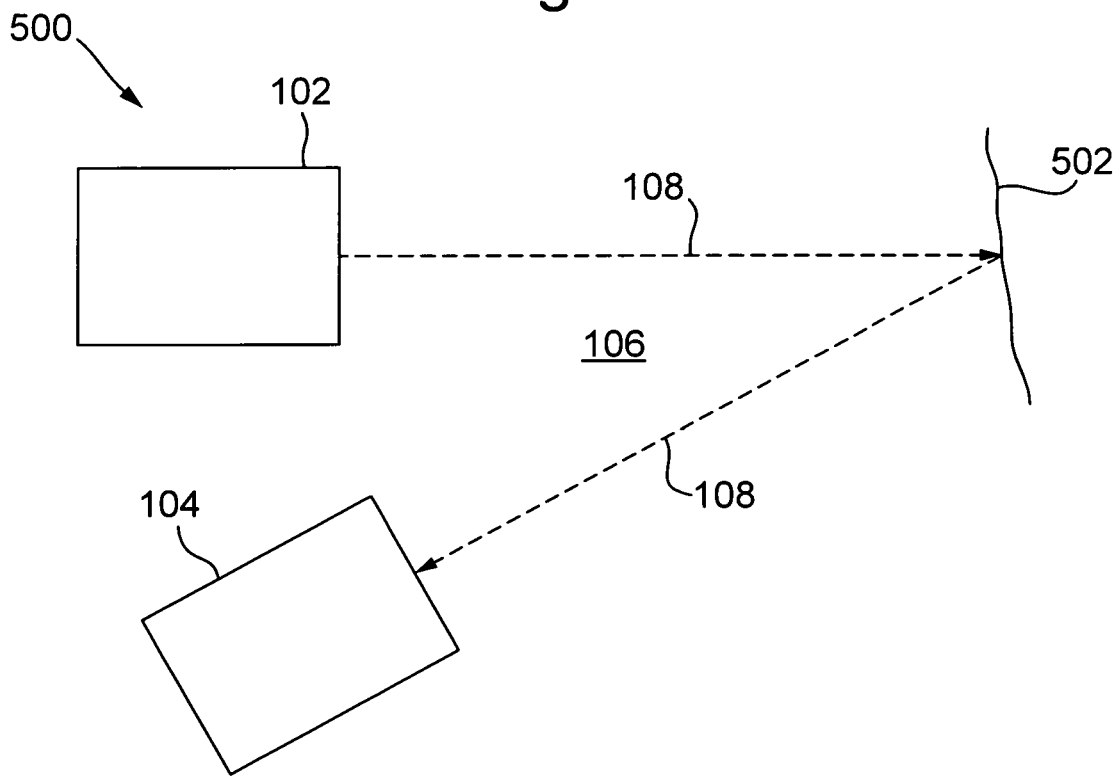
FIG. 5 is a schematic illustration (not to scale) of a further embodiment of the optical sensing and communications system.
Figure 6:
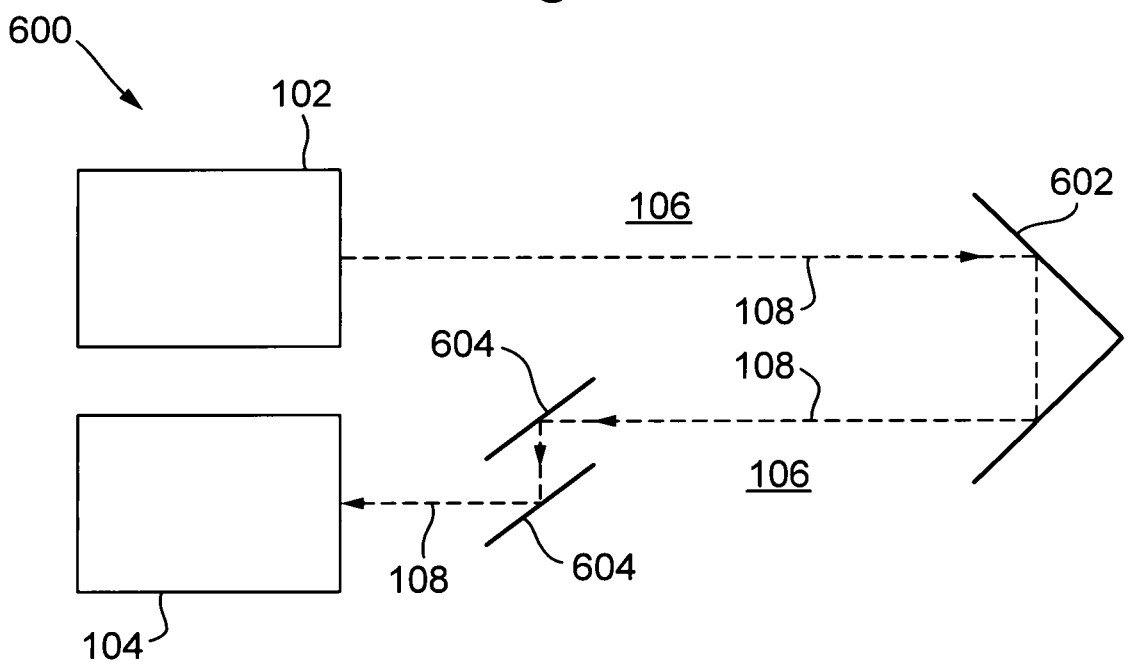
FIG. 6 is a schematic illustration (not to scale) of a second further embodiment of the optical sensing and communications system.

What will now be described with reference to FIGS. 5 and 6 are two further embodiments in which optical signals are indirectly sent from the transmitter to the receiver. In the Figures, like reference numerals refer to like elements. For reasons of convenience and ease of depiction, the processor 110 and the communications link 112 are not shown in FIGS. 5 and 6.

FIG. 5 is a schematic illustration (not to scale) of a further embodiment of the optical sensing and communications system, hereinafter referred to as the further system 500.

In the further system 500, the transmitter 102 transmits an optical signal 108 through the optical medium 106 from the transmitter 102 to a scattering surface 502. The scattering surface 502 scatters at least a portion of the incident optical signal 108 towards the receiver 104. The scattered optical signal 108 travels from the scattering surface 502 to the receiver 104, which receives the scattered optical signal 108.

The scattering surface 502 may be a surface of a particle or entity under test. The particle or entity under test may be located in the optical medium 106.

In this further embodiment, the further system 500 may be used in a sensing application. For example, the scattered optical signal 108 may be measured by the receiver 104 and/or processor 110 to determine one or more properties of the scattering surface 502, and/or the optical medium 106.

FIG. 6 is a schematic illustration (not to scale) of a second further embodiment of the optical sensing and communications system, hereinafter referred to as the second further system 600.

In the second further system 600, the transmitter 102 transmits an optical signal 108 through the optical medium 106 from the transmitter 102 to a retro-reflector 602. The retro-reflector 602 reflects the incident optical signal substantially back along its incoming path towards the transmitter 102. In this embodiment, additional reflectors 604 redirect the reflected optical signal 108 towards the receiver 104. The receiver 104 receives the reflected optical signal 108. In this second further embodiment, the receiver 104 is located side-by-side with the transmitter 102.

In some embodiments, the receiver 104 is collocated with the transmitter 102. For example, the transmitter 102 and the receiver 104 may be same device. In such embodiments, the additional reflectors 604 may be omitted.

In this second further embodiment, the second further system 600 may be used in a communications and/or a sensing application. For example, communications signals may be sent from the transmitter to the receiver 104 e.g. as described in more detail earlier above with reference to FIG. 2. Also for example, in a sensing application, the reflected optical signal 108 may be measured by the receiver 104 and/or processor 110 to determine one or more properties of the optical medium 106.

In some embodiments, a communications link via which the receiver/processor may send signal magnitude information to the transmitter may be omitted. For example, in some embodiments, there is no feedback from the receiver to the transmitter as to the signal level being received by the receiver. In such cases, the sequence of pulses may be repeated by the transmitter such that the receiver receives multiple "best" pulses, from which the receiver may determine data. For example, in some embodiments, for example in embodiments in which the optical sensing and communications system is used in a sensing application, the transmitter may repeatedly transmit the sequence of pulses to the receiver, and the receiver/processor may determine the "best" pulse from each of these repetitions of the sequence. Using the multiple "best" pulses, the receiver/processor may determine measurements of material properties of one or more entities with which the sensing signal interacted between the transmitter and receiver, for example the optical medium. The receiver/processor may determine measurements of material properties using a known value of the transmitter power.

In the above embodiments, the transmitter comprises one or more lasers for generating optical signals. Also, the sequence of transmit pulses is generated by directly modulating the output from the transmitter lasers, for example, by controlling the drive current of the lasers. However, in other embodiments, optical signals are generated in a different way other than by using lasers, for example using light emitting diodes.

Also, in some embodiments, the sequence of transmit pulses is generated in a different appropriate way. For example, in some embodiments, the sequence of transmit pulses is generated by external modulation. An external modulator can be employed to generate the sequence of pulses. External modulators can be based on, for example, electro-optic or acousto-optic techniques. Some lasers, in particular laser diode pumped solid state (DPSS) devices, tend to be restricted in the level of direct control that can be realised over their output power. This is especially the case for passively Q-switched lasers. External modulation tends to be particularly useful in such cases. External modulation can also be applied to continuous wave (CW) sources.

Also, in some embodiments a recirculating fibre optic delay line is implemented to generate the sequence of pulses. Such a method tends to provide many orders of magnitude variation.

FIG. 7 is a schematic illustration (not to scale) showing a recirculating fibre optic delay line system 700 coupled to the optical sensing and communications system 100.

In this embodiment, the fibre optic delay line system 700 comprises a laser unit 702, a first beam splitter 704, a second beam splitter 706, a fibre optic delay line 708, a power monitor 710, and a control unit 712.

The laser unit 702 is configured to generate a laser pulse. The laser unit 702 is coupled to the first beam splitter 704, for example by an optical fibre, such that in operation the laser pulse generated by the laser unit 702 is sent from the laser unit 702 to the first beam splitter 704.

The first beam splitter 704 is configured to split incident optical signals. The first beam splitter 704 has a transmissivity of $T_1$ and a reflectivity of $R_1$. In this embodiment, $T_1 + R_1 = 1$. In addition to being coupled to the laser unit 702, the first beam splitter 704 is further coupled to the second beam splitter 706, for example by an optical fibre, such that an optical signal may be sent from the first beam splitter 704 to the second beam splitter 706. The first beam splitter 704 is further coupled to the fibre optic delay line 708 such that an optical signal may be received by the first beam splitter 704 from the fibre optic delay line 708. The first beam splitter 704 is further coupled to the power monitor 710, for example by an optical fibre, such that an optical signal may be sent from the first beam splitter 704 to the power monitor 710.

The second beam splitter 706 is configured to split incident optical signals. The second beam splitter 706 has a transmissivity of $T_2$ and a reflectivity of $R_2$. In this embodiment, $T_2 + R_2 = 1$. In addition to being coupled to the first beam splitter 704, the second beam splitter 706 is further coupled to the transmitter 102, for example by an optical fibre, such that an optical signal may be sent from the second beam splitter 706 to the transmitter 102. The second beam splitter 706 is further coupled to the fibre optic delay line 708 such that an optical signal may be sent to the fibre optic delay line 708 from the second beam splitter 706.

The fibre optic delay line 708 comprises a length of fibre optic wire coupling an output of the second beam splitter 706 to an input of the first beam splitter 704.

The power monitor 710 comprises one or more processors configured to process incoming optical signals, and to generate a corresponding output. In this embodiment, in addition to being coupled to the first beam splitter 704, the power monitor 710 is further coupled to the receiver 104 such that an output of the receiver 104 may be received by the power monitor 710. The power monitor 710 is further coupled to the control unit 712 such that an output of the power monitor 710 may be received by the control unit 712.

The control unit 712 is configured to control operation of the laser unit 702 based on the signal received from the power monitor 710.

What will now be described is an operation of the recirculating fibre optic delay line system 700 and the optical sensing and communications system 100 for generating the sequence of transmit pulses 300 between the transmitter 102 and the receiver 104.

In operation, the laser unit 702 generates a laser pulse. The laser pulse travels from the laser unit 702 to the first beam splitter 704.

The first beam splitter 704 then splits the incident laser pulse such that a laser pulse having magnitude $T_1$ is transmitted to the second beam splitter 706, and a laser pulse having magnitude $R_1$ is reflected to the power monitor 710.

The second beam splitter 706 then splits the incident laser pulse having magnitude $T_1$ such that a laser pulse having magnitude $T_1 T_2$ is transmitted to the transmitter 102, and a laser pulse having magnitude $T_1 R_2$ is reflected to the fibre optic delay line 708.

The transmitter 102 then receives the laser pulse having magnitude $T_1 T_2$, and transmits a laser pulse having a magnitude $T_1 T_2$ to the receiver 104. This transmitted laser pulse is the first transmit pulse 301.

The laser pulse having magnitude $T_1 R_2$ reflected by the second beam splitter 706 travels along the fibre optic delay line 708 to the first beam splitter 704.

The first beam splitter 704 then splits the incident laser pulse having magnitude $T_1 R_2$ such that a laser pulse having magnitude $T_1(R_1 R_2)$ is reflected to the second beam splitter 706, and a laser pulse having magnitude $T_1^2 R_2$ is transmitted to the power monitor 710.

The second beam splitter 706 then splits the incident laser pulse having magnitude $T_1(R_1 R_2)$ such that a laser pulse having magnitude $T_1 T_2(R_1 R_2)$ is transmitted to the transmitter 102, and a laser pulse having magnitude $T_1(R_1 R_2^2)$ is reflected to the fibre optic delay line 708.

The transmitter 102 then receives the laser pulse having magnitude $T_1 T_2(R_1 R_2)$, and transmits a laser pulse having a magnitude $T_1 T_2(R_1 R_2)$ to the receiver 104. This transmitted laser pulse is the second transmit pulse 302.

This process repeats such that the transmitter 102 receives a sequence of laser pulses having decreasing magnitude. The transmitter 102 transmits the received sequence of laser pulses to the receiver 104.

In this embodiment, the sequence of pulses received and transmitted by the transmitter have magnitudes equal to $T_1 T_2(R_1 R_2)^{n-1}$, where n is the number of the pulse, i.e. n=1, ..., 6. In other words, the first transmit pulse 301 has magnitude $T_1 T_2(R_1 R_2)^0 = T_1 T_2$; the second transmit pulse 302 has magnitude $T_1 T_2(R_1 R_2)$; the third transmit pulse 303 has magnitude $T_1 T_2(R_1 R_2)^2$; the fourth transmit pulse 304 has magnitude $T_1 T_2(R_1 R_2)^3$, and so on. Thus, the reduction in signal magnitude from one pulse to the next is determined by the product $R_1 R_2$. This reduction factor may be set to be 10. Thus, in some embodiments $(1-T_1)(1-T_2)=0.1$.

Preferably, $T_1$ is equal to $T_2$. This tends to maximise signal magnitude. In some embodiments, $R_1 = R_2 = 0.32$ and $T_1 = T_2 = 0.68$. In such embodiments, the first transmit pulse 301 has a magnitude of approximately 0.47 compared with the original pulse from the laser unit 702.

In this embodiment, the laser pulses received by the transmitter are spaced apart by approximately the time it takes for a laser pulse to travel around the fibre optic delay line 708. The fibre optic delay line 708 may be configured, for example by varying its length, to provide a desired pulse rate.

In operation, the laser light transmitted/reflected to the power monitor 710 by the first beam splitter 704 may be usefully employed for monitoring or alignment purposes.

The invention claimed is:
1. An optical system comprising:
a transmitter module configured to transmit a sequence of optical pulses, wherein the transmitted sequence of optical pulses is a sequence of optical pulses having decreasing magnitudes;

a receiver module comprising one or more optical signal detectors, the receiver module configured to receive the sequence of optical pulses transmitted by the transmitter module; and one or more processors configured to process the sequence of optical pulses received by the receiver module to select an optical pulse from the received sequence of optical pulses based on one or more predetermined criteria;

wherein the one or more predetermined criteria include a criterion that the selected optical pulse does not saturate the one or more optical signal detectors.

2. The optical system according to claim 1, wherein the receiver module comprises a photomultiplier detector for detecting the sequence of optical pulses transmitted by the transmitter module.

3. The optical system according to claim 1, wherein the one or more processors are configured to select, from those optical pulses having magnitudes within linear range of the receiver, a pulse that has the largest magnitude.

4. The optical system according to claim 1, wherein the one or more processors are configured to select, from the received sequence of optical pulses, a largest magnitude optical pulse that does not saturate an optical signal detector of the receiver module.

5. The optical system according to claim 1, wherein the transmitted sequence of optical pulses is the sequence of optical pulses having strictly decreasing magnitudes.

6. The optical system according to claim 1, wherein the one or more processors are further configured to determine data from the selected optical pulse, the data specifying a material property of one or more entities with which the selected optical pulse interacted between the transmitter module and the receiver module.

7. The optical system according to claim 1, further comprising means for transferring, from the one or more processors to the transmitter module, information specifying the selected optical pulse.

8. The optical system according to claim 7, wherein the transmitter module is further configured to, responsive to the transmitter module receiving the information specifying the selected optical pulse, transmit a further optical signal to the receiver module, the further optical signal having a magnitude substantially equal to the pulse from the transmitted sequence that corresponds to the selected optical pulse.

9. The optical system according to claim 1, wherein the optical system further comprises one or more objects disposed between the transmitter module and the receiver module, the one or more objects arranged to:

receive the sequence of optical pulses transmitted by the transmitter module; and reflect and/or scatter the received sequence of optical pulses to the receiver module.

10. The optical system according to claim 9, wherein the one or more objects comprises a retro-reflector.

11. The optical system according to claim 1, wherein the transmitter module comprises:

one or more transmitter lasers configured to generate a sequence of optical pulses; and a modulator configured to modulate the optical pulses generated by the one or more transmitter lasers to provide that each optical pulse in the sequence has a different magnitude to each other pulse in the sequence.

12. The optical system according to claim 1, further comprising:

one or more lasers configured to generate an optical signal;

a first beam splitter;
a second beam splitter; and
an optical delay line;
wherein the one or more lasers are coupled to a first input of the first beam splitter such that the first beam splitter receives an optical signal from the one or more lasers;

the first beam splitter is configured to split an optical signal received at its first input between a first output of the first beam splitter and a second output of the first beam splitter;

an input of the second beam splitter is coupled to the first output of the first beam splitter;

the second beam splitter is configured to split an optical signal received at its input between a first output of the second beam splitter and a second output of the second beam splitter;

the transmitter module is coupled to the first output of the second beam splitter;

an input of the optical delay line is coupled to the second output of the second beam splitter;

an output of the optical delay line is coupled to a second input of the first beam splitter; and the first beam splitter is configured to split an optical signal received at its second input between the first output of the first beam splitter and the second output of the first beam splitter.

13. The optical system according to claim 12, wherein a transmitivity of the first beam splitter is substantially equal to a transmitivity of the second beam splitter.

14. The optical system according to claim 1, wherein the receiver module comprises a photomultiplier detector for detecting the sequence of optical pulses transmitted by the transmitter module, and wherein the one or more processors are configured to select, from those optical pulses having magnitudes within linear range of the photomultiplier detector, a pulse that has the largest magnitude, wherein the selected largest magnitude optical pulse does not saturate the photomultiplier detector.

15. The optical system according to claim 1, further comprising a communications link for transferring, from the one or more processors to the transmitter module, information specifying the selected optical pulse.

16. The optical system according to claim 15, wherein the communications link is an optical communications link.

17. The optical system according to claim 15, wherein the communications link is a wireless communications link.

18. A method for performance by an optical system, the method comprising:

transmitting, by a transmitter module, a sequence of optical pulses, wherein the transmitted sequence of optical pulses is a sequence of optical pulses having decreasing magnitudes;

receiving, by a receiver module comprising one or more optical signal detectors, the sequence of optical pulses transmitted by the transmitter module; and processing, by one or more processors, the sequence of optical pulses received by the receiver module to select an optical pulse from the received sequence of optical pulses based on one or more predetermined criteria;

wherein the one or more predetermined criteria include a criterion that the selected optical pulse does not saturate the one or more optical signal detectors.

19. An optical system comprising:
- a transmitter module configured to transmit a sequence of optical pulses, each optical pulse in the sequence having a different magnitude relative to each other optical pulse in the sequence;
- a receiver module comprising one or more optical signal detectors, the receiver module configured to receive the sequence of optical pulses transmitted by the transmitter module; and
- one or more processors configured to process the sequence of optical pulses received by the receiver module to select an optical pulse from the received sequence of optical pulses based on one or more predetermined criteria, wherein at least two optical pulses of the sequence of optical pulses are transmitted subsequent to a transmission of the selected optical pulse of the sequence of optical pulses,
- wherein the one or more predetermined criteria include a criterion that the selected optical pulse does not saturate the one or more optical signal detectors.

20. The optical system of claim 19, wherein the transmitted sequence of optical pulses is a sequence of optical pulses having decreasing magnitudes.

\* \* \* \* \*